United States Patent [19]
Kenison et al.

[11] Patent Number: 4,622,808
[45] Date of Patent: Nov. 18, 1986

[54] SURGE/STALL CESSATION DETECTION SYSTEM

[75] Inventors: David F. Kenison, Glastonbury; Donald E. Sheppard, South Windsor, both of Conn.

[73] Assignee: United Technologies Corporation, Hartford, Conn.

[21] Appl. No.: 683,903

[22] Filed: Dec. 20, 1984

[51] Int. Cl.$^4$ .............................. F02C 9/00; F02C 9/18
[52] U.S. Cl. ..................................... 60/39.29; 415/27
[58] Field of Search ............. 60/39.091, 39.13, 39.141, 60/39.27, 39.29; 415/26, 27, 28

[56] References Cited
U.S. PATENT DOCUMENTS

| | | | |
|---|---|---|---|
| 4,060,980 | 12/1977 | Elsaesser et al. | 60/39.29 |
| 4,117,668 | 10/1978 | Elsaesser et al. | 60/39.29 |
| 4,118,926 | 10/1978 | Curvino et al. | 60/39.06 |
| 4,164,034 | 8/1979 | Glennon et al. | 60/39.29 |

Primary Examiner—Louis J. Casaregola
Attorney, Agent, or Firm—Norman Friedland

[57] ABSTRACT

The cessation of stall/surge in the compressor of a twin spool gas turbine engine is detected by comparing by digital electronics the engine's sensed burner pressure with a burner pressure calculated from corrected low pressure compressor speed and sensed airplane Mach number which has been compensated to approximate engine dynamics.

3 Claims, 3 Drawing Figures

SURGE/STALL CESSATION DETECTION SYSTEM

DESCRIPTION

1. Technical Field

This invention relates to gas turbine engines and particularly to means for detecting the cessation of surge or stall.

2. Background Art

As is well known, stall and surge are likely occurrences in axial flow compressors of gas turbine engines unless corrective action is taken to abate them. Surge is that phenomenon, although the theory is not completely understood, where a sufficient number of compressor blades stall as a result of flow separation causing the pressure in the compressor to drop very rapidly resulting in continual pressure oscillations. At times, stalling of a particular blade or several blades doesn't necessarily manifest into an overall surge condition, but propagates undesirable pressure pulsations downstream of the engine.

To abate stall or surge or to prevent either from occurring the engine control systems are designed with schedules that account for the engine stall/surge characteristic and avoid operating in the regime where stall/surge may occur. For example, the fuel control may be designed with predetermined limits to reduce the delivered fuel particularly during acceleration above a predetermined rate to avoid the engine's operating surge line. Automatically opening of compressor bleeds during aircraft deceleration modes when the engine is operating at low power is another well known method of avoiding stall.

Other techniques are known to abate stall/surge as by detecting when there is an incipient stall/surge condition by measuring certain engine operating parameters. An example of a system of this type is disclosed in U.S. Pat. No. 4,117,668 entitled "Stall Detector for Gas Turbine Engine" granted to F. L. Elsaesser and J. H. Hall on Oct. 3, 1978 and assigned to UTC, the assignee common to this patent application.

Once stall/surge has occurred there are well known methods for abating this condition and the one type most commonly employed is by opening the engine's compressor bleeds so as to dump air out of the compressor. After the stall/surge condition has abated, it is desirable to restart the engine in the situation where the engine is completely shut down or return to the desired operating mode when the stall/surge has abated. The industry has seen certain attempts to restart the engine, but typically these systems either wait until a given time has elapsed before a restarting cycle is initiated or it may be done automatically upon certain engine operating conditions meeting given criteria. An example of the later system is disclosed in U.S. Pat. No. 4,118,926, granted to S. J. Curvino and A. E. Warner on Oct. 10, 1978 and assigned to United Technologies Corporation, the assignee common to this patent application.

However, in any engine restart control systems it is abundantly important that restart occurs only after the systems deployed for recovery are returned to the condition where they won't impact adverse engine operation. Hence, in the event the compressor bleed system is opened and/or the engine's geometry has been changed to correct the stall/surge condition, it is undesirable to restart the engine or return to the engine operating mode until after these systems have been placed in an operative condition so that they won't either adversely affect the stall/surge recovery or won't penalize engine performance by overusing fuel.

DISCLOSURE OF INVENTION

A feature of this invention is to ascertain when a surge/stall occurrence on a gas turbine engine has terminated. A feature of this invention is to measure burner pressure, engine inlet temperature, and compressor speed and to electronically calculate the relationship of burner pressure and corrected compressor speed for the nonstalled condition.

This system contemplates comparing the engine's sensed burner pressure with a burner pressure calculated from corrected low pressure compressor speed and sensed aircraft Mach number which has been compensated to approximate engine dynamics. The relationship can then be compared to the nonstalled compressor to ascertain the cessation of the stalled condition.

Other features and advantages will be apparent from the specification and claims and from the accompanying drawings which illustrate an embodiment of the invention.

BEST MODE FOR CARRYING OUT THE INVENTION

Figure 1:
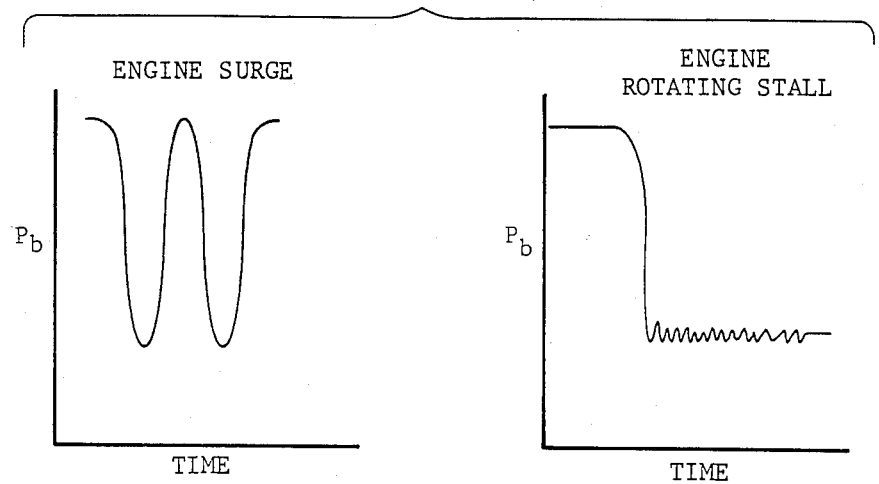
FIG. 1 is a graphical illustration of the burner pressure relationship with respect to time for engine surge and engine rotating stall conditions.

For the purposes of this description, the relationship of engine surge and engine rotating stall are defined by the graphical illustration presented in FIG. 1. $P_b$ is indicative of pressure in the burner of the gas turbine engine and is plotted relative to time. The engine surge is a manifestation of a 360° flow pattern in the compressor, and the engine rotating stall is a manifestation of a stall pattern as it propagates downstream through the engine off of a localized point of the compressor blade. In its preferred embodiment, this invention is described in combination with a twin spool gas turbine engine like the PW2037 manufactured by Pratt & Whitney Aircraft of United Technologies Corporation, the assignee of this patent application.

It is abundantly important that the system for detecting when the surge/stall is completely abated is cognizant of both the engine surge condition and engine rotating stall condition. While burner pressure is a satisfactory measurement to obtain an indication of the incipient engine surge as well as engine rotating stall, it, however, is not a satisfactory parameter for indicating when the engine rotating stall has concluded.

The portion of this description will describe the means to ascertain the cessation of engine rotating stall which measurement can also be used as an indication of the termination of engine surge. According to this invention, the engine sensed burner pressure is compared with a calculated burner pressure (calculated from corrected low compressor speed ($N_1/\sqrt{\theta_{T2}}$ obtained by measuring the R.P.M. of the low pressure compressor and temperature at the inlet of the engine and sensed airplane Mach number) which has been compensated to approximate engine dynamics.

Figure 2:
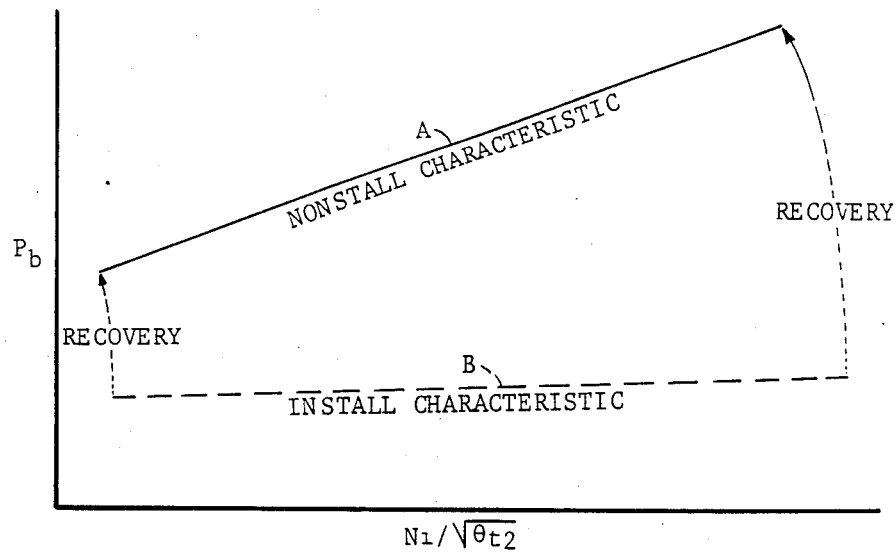
FIG. 2 is a graphic showing of the relationship of burner pressure to corrected compressor speed.

This relationship is graphically illustrated in FIG. 2 which is a plot of sensed burner pressure ($P_b$) versus corrected low compressor speed ($N_1/\sqrt{\theta_{T2}}$). When the burner pressure in the stall characteristic, as identified by the line A (for a given corrected low pressure compressor speed ($N_1/\sqrt{\theta_{T2}}$)) approaches the burner pressure in the nonstall characteristic represented by line B, i.e. when line A moves up to line B, the stall has completely abated. As this condition is sensed, the corrective action such as the opening of compressor bleed valves changing angles of the variable stator vanes and/or fuel flow adjustments, will then be returned to the condition where these settings will not interfere with the restarting of the engine, or continuing engine operation as the case may be. However, of equal importance the next sequence of engine operation will not result in a penalty to the engine operation once the compression system has recovered from stall/surge. The implementation for achieving this system for determining the cessation of engine surge and engine rotating stall is best shown in FIG. 3.

As noted, a schematic representation of a twin spool turbine power plant is generally illustrated by reference numeral 10 having the low pressure compressor 12 driven by the low pressure turbine 14 and the high pressure compressor 16 driven by the high pressure turbine 18. Fuel from the fuel valve 28 which is controlled by the fuel control generally illustrated by the box 21 which may be a suitable electronic digital control like the EEC-104 manufactured by the Hamilton Standard Division of United Technologies Corporation, the assignee of this patent application, is suitably delivered to the burners 20. A suitable engine and in fact, the one where this invention is being utilized, is the PW2037 engine. For an understanding of this invention, it is only sufficient to know that the compressors are of the axial flow type which are susceptible of experiencing engine surge and/or engine rotating stall. This particular engine is capable of abating the surge/stall condition by adjusting the stator vanes generally illustrated by reference numeral 24, opening the compressor bleed valve 26 and/or adjusting the fuel control valve 28.

Figure 3:
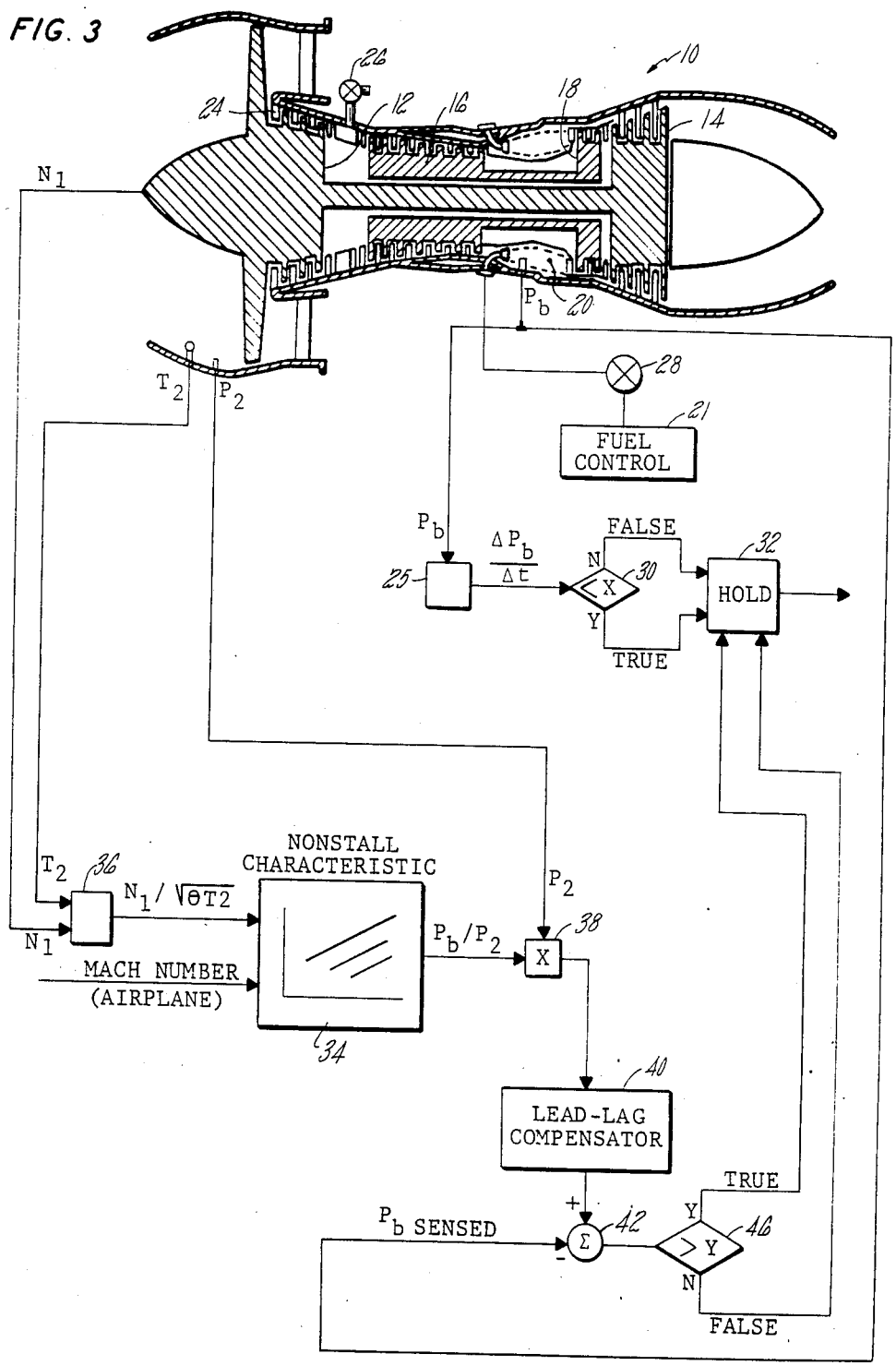
FIG. 3 is a block diagram of a digital electronic computer execution for determining cessation of stall/surge.

As is apparent from FIG. 3, the burner pressure is sensed and is computed into a time derivative signal $\Delta P_b/\Delta \tau$ in a well known manner at the box 25. This signal is then fed to comparator 30 that compares the value with a fixed value which has been predetermined as being indicative of a stall/surge or nonstall/surge condition. Upon the initiation of stall/surge, the comparator 30 will pass an output signal indicative of the stall/surge to the network (not shown) designed to take corrective action as described above. The hold circuit 32 holds this value until the surge/stall has completely subsided.

At the same time the function generator 34 responding to corrected low pressure compressor speed as calculated by the calculator box 36 and aircraft Mach number produces a signal indicative of the nonstall/surge characteristic which is a value indicative of the ratio $P_b/P_2$ ($P_2$ equal sensed engine inlet total pressure).

This signal ($P_b/P_2$) is then multiplied by multiplier 38 by measured $P_2$ and then fed to the lead lag circuit 40 for applying a compensation value to approximate the engine's dynamics. The output of multiplier 38 is thusly a compensated $P_b$ signal that is a value of the nonstall characteristics represented by line B in FIG. 2.

The comparator 42 compares measured actual $P_b$(line A of FIG. 2) to ascertain the state of the stall. The output of comparator 42 is transmitted to the comparator circuit 46 that compares this value with a predetermining constant. If the value is greater than this constant, a true flagged signal is applied to the hold circuit 32 to continue with the corrective action. If the value falls below the constant in comparator 46 a false flag will be generated indicating the stall condition has ceased, and hence corrective action for abating the stall/surge can be terminated.

It should be understood that the invention is not limited to the particular embodiments shown and described herein, but that various changes and modifications may be made without departing from the spirit and scope of this novel concept as defined by the following claims.

We claim:

1. For an aircraft twin spool turbine power plant having low pressure compressor, a high pressure compressor and burner, means for electronically ascertaining the cessation of stall/surge in the compressor including:
    means responsive to corrected low pressure compressor speed and Mach number of the aircraft to generate a first signal indicative of a schedule of a family of curves that are indicative of the nonstall characteristic of the power plant,
    means responsive to the rate of change with respect to time of actual burner pressure for generating a second signal indicative of a stall/surge condition,
    means responsive to actual burner pressure to produce a third signal,
    a summer responding to said first signal and said third signal to produce a fourth signal indicative of a stall condition,
    and a holding circuit permitting said second signal to produce an output solely when said second signal and said fourth signal are indicative of a stall condition.

2. For an aircraft twin spool gas turbine power plant as in claim 1 including means responsive to compressor inlet pressure for producing a fifth signal, an electronic multiplier means for multiplying said first signal by said fifth signal.

3. For an aircraft twin spool gas turbine power plant as in claim 1 including a lead-lag compensation network to impose a value on said first signal after said first signal is multiplied by said fifth signal to account for the dynamic characteristics of said power plant.

* * * * *